US007953101B2

(12) United States Patent
Loprieno et al.

(10) Patent No.: US 7,953,101 B2
(45) Date of Patent: May 31, 2011

(54) ENCODING FIBRE CHANNEL OVER ETHERNET TRANSPORT

(75) Inventors: Gilberto Loprieno, Milan (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 12/370,605

(22) Filed: Feb. 13, 2009

(65) Prior Publication Data
US 2010/0209102 A1    Aug. 19, 2010

(51) Int. Cl.
*H04L 12/56* (2006.01)
*H04J 3/22* (2006.01)
*G06F 12/16* (2006.01)

(52) U.S. Cl. ........ 370/401; 370/394; 370/466; 709/236; 709/250

(58) Field of Classification Search .......... 370/401, 370/400, 394, 465, 466, 470, 471, 474, 392, 370/389; 398/43, 154; 709/250, 230, 232, 709/236, 246
See application file for complete search history.

(56) References Cited

U.S. PATENT DOCUMENTS
| 7,114,009 | B2 | 9/2006 | Jones et al. | |
| 2007/0127526 | A1* | 6/2007 | Xiong et al. | 370/474 |
| 2007/0226532 | A1* | 9/2007 | Matsuda | 714/4 |

OTHER PUBLICATIONS

Next-generation SONET for Cable MSOs: Technical Overview, Nortel Networks, 2003 available on the Web at http://down.ciw.com.cn/UploadFiles_1727/200703/20070328065545611.pdf.
Master Transparent-Mode GFP: Part 1, Gorshe, Communication Systems Design, Sep. 2002, pp. 28-30 available on the Web at http://i.cmpnet.com/commsdesign/csd/2002/sep02/sept02-feat2.pdf.
GFPT-T Processor IP Core (GFPT-T), INTEC Systems, 2005 available on the Web at http://www.intec2000.com/GFPT.html.

* cited by examiner

*Primary Examiner* — Pankaj Kumar
*Assistant Examiner* — Saba Tsegaye
(74) *Attorney, Agent, or Firm* — Charles E. Krueger (57) ABSTRACT

In one embodiment, data words and ordered sets in a Fibre Channel data stream are formed into a group and the ordered sets are moved to the beginning word positions of the group. The ordered sets are encoded so that a control character in the first byte of the ordered set is replaced with a control code byte encoding the original location of the ordered set in the group, the identity of the control character replaced by the control code byte, and whether the following word is an ordered set.

18 Claims, 8 Drawing Sheets

FIG. 1

| NAME | Byte Value | 10B Codeword (RD-) abcdei fghj | 10B Codeword (RD+) abcdei fghj | 4-bit Mapping |
|---|---|---|---|---|
| /K28.0/ | 1C | 001111 0100 | 110000 1011 | 0000 |
| /K28.1/ | 3C | 001111 1001 | 110000 0110 | 0001 |
| /K28.2/ | 5C | 001111 0101 | 110000 1010 | 0010 |
| /K28.3/ | 7C | 001111 0011 | 110000 1100 | 0011 |
| /K28.4/ | 9C | 001111 0010 | 110000 1101 | 0100 |
| /K28.5/ | BC | 001111 1010 | 110000 0101 | 0101 |
| /K28.6/ | DC | 001111 0110 | 110000 1001 | 0110 |
| /K28.7/ | FC | 001111 1000 | 110000 0111 | 0111 |
| /K23.7/ | F7 | 111010 1000 | 000101 0111 | 1000 |
| /K27.7/ | FB | 110110 1000 | 001001 0111 | 1001 |
| /K29.7/ | FD | 101110 1000 | 010001 0111 | 1010 |
| /K30.7/ | FE | 011110 1000 | 100001 0111 | 1011 |
| 10B_ERR | N/A | Unrecognized RD- | Unrecognized RD+ | 1100 |
| 65B_PAD | N/A | N/A | N/A | 1101 |
| Spare | N/A | N/A | N/A | 1110 |
| Spare | N/A | N/A | N/A | 1111 |

FIG. 2

| Input Data | SyncBit | 256-bit Field (8 Words - each of 4 bytes) | | | | | | | |
|---|---|---|---|---|---|---|---|---|---|
| | | W1 | W2 | W3 | W4 | W5 | W6 | W7 | W8 |
| All Data Words | 0 | 0,aaa,C1 | D1 | D2 | D3 | D4 | D5 | D6 | D7 |
| 7 Data Words + 1 OS | 1 | 1,aaa,C1 | 0,bbb,C2 | D1 | D2 | D3 | D4 | D5 | D6 |
| 6 Data Words + 2 OS | 1 | 1,aaa,C1 | 1,bbb,C2 | 0,ccc,C3 | D1 | D2 | D3 | D4 | D5 |
| 5 Data Words + 3 OS | 1 | 1,aaa,C1 | 1,bbb,C2 | 1,ccc,C3 | 0,ddd,C4 | D1 | D2 | D3 | D4 |
| 4 Data Words + 4 OS | 1 | 1,aaa,C1 | 1,bbb,C2 | 1,ccc,C3 | 1,ddd,C4 | 0,eee,C5 | D1 | D2 | D3 |
| 3 Data Words + 5 OS | 1 | 1,aaa,C1 | 1,bbb,C2 | 1,ccc,C3 | 1,ddd,C4 | 1,eee,C5 | 0,fff,C6 | D1 | D2 |
| 2 Data Words + 6 OS | 1 | 1,aaa,C1 | 1,bbb,C2 | 1,ccc,C3 | 1,ddd,C4 | 1,eee,C5 | 1,fff,C6 | 0,ggg,C7 | D1 |
| 1 Data Words + 7 OS | 1 | 1,aaa,C1 | 1,bbb,C2 | 1,ccc,C3 | 1,ddd,C4 | 1,eee,C5 | 1,fff,C6 | 1,ggg,C7 | 0,hhh,C8 |
| All OS | 1 | | | | | | | | |

FIG. 10

ENCODING FIBRE CHANNEL OVER ETHERNET TRANSPORT

TECHNICAL FIELD

The present disclosure relates generally to solutions for extending Storage Area Networks (SANs) between geographically dispersed locations.

BACKGROUND OF THE INVENTION

Proliferation of storage traffic due to disaster recovery and business continuity requirements, combined with the high cost associated with downtime or loss of data, justifies the need for storage area network (SAN) extensions over geographically dispersed areas. Enterprises as well as service providers are seeking affordable solutions to interconnect their SAN islands and implement geographically dispersed data recovery solutions. SAN extension solutions help to interconnect customer storage islands which are geographically dispersed and are the key enabler for disaster recovery and business continuance applications.

One of the most popular protocols for SANs is Fibre Channel. All information in Fibre Channel is transmitted as transmission words which are groups of four transmission characters, each of which is one byte in length. Some transmission words have a K28.5 character as the first transmission character. Groups of four transmission characters which have a K28.5 character as the first transmission character are called ordered sets. Some ordered sets mark the beginning and end of frames (frame delimiters). Others convey information in between frames in the form of primitive indications (a single ordered set) and primitive sequences (a stream of the same ordered set). Examples of ordered sets are: start of frame (SOF), end of frame (EOF), idle, receiver_ready (R_RDY), and several others. Examples of a stream of the same ordered set are link reset (LR), link reset response (LRR), not operational (NOS), offline (OLS), and others. Some of the primitive sequences are used to set up the communication channel that is needed before data transfer can occur between two Fibre Channel enabled devices.

The three primary technologies available to extend the Fibre Channel protocol across a wide-area network (WAN) are SAN over dense wavelength-division multiplexing (DWDM), IP, and SONET/SDH. The International Telecommunications Union (ITU) has developed a transparent-mode version of the generic framing procedure (GFP-T) that allows designers to package SAN traffic into a virtually concatenated pipe to use fully the available bandwidth of the Sonet/SDH network to fully leverage their capabilities.

The GFP-T utilizes a 64B/65B encoding technique to map 8B/10B data and control codes into eight payload bytes and a flag bit. The leading flag bit indicates whether control codes are included in the 64B/65B code where a flag value of 1 indicates the presence of control codes. A control code byte consists of three fields, the first being a single bit set to logic zero if the byte holds the last control code in the 64B/65B code. The second field is a 3-bit address indicating the original location of the control code in a client data field. The third field is a 4-bit field encoding the identity of the control code.

DESCRIPTION OF EXAMPLE EMBODIMENTS

OVERVIEW

In an example embodiment, a first ordered set included in a received group of Fibre Channel (FC) protocol words is moved from its original word position to a first word position in the received group of FC protocol words to form a reordered group of FC protocol words, with each FC protocol word having four byte positions and being either a data word including four data bytes or an ordered set including a control character followed by three data bytes.

A syncbit having a first logic value is pre-pended to the reordered group and the control character in the first ordered set is replaced with a control code byte indicating whether the FC protocol word in the second word position of the reordered group is an ordered set or a data word, indicating the original word position of the first ordered set in the received group of FC protocol words and indicating the identity of the control character included in the first ordered set.

A transmitted reordered group of FC protocol words is received and the control code byte of a first word in the first word position of the transmitted reordered group of FC protocol words is interpreted, if the syncbit has the first logic value, to determine the original position of the first word in the received group of Fibre Channel (FC) protocol words and identify the control character.

The control code byte is replaced with an identified control character to form the first ordered set and the first ordered set is moved to its original position in the received group of FC control words.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

The New Generation Network based on Ethernet requires the mapping of SAN protocols (such as Fibre Channel) over Ethernet.

Ethernet utilizes 8b/10b encoding to transmit frames over a medium. As is known in the art, in 8b/10b encoding bytes of data are mapped to 10-bit codes at the transmitter so that the running disparity of the ones and zeros transmitted over the medium remains balanced to facilitate clock-recovery at the receiver where the 10-bit codes are decoded back to the original byte values. Each data code (D-code) has positive and negative disparity versions and the encoder selects a D-code version of the correct disparity to maintain a balanced running disparity. Certain 10-bit codes are reserved as control codes (K-codes) which also have positive and negative disparity versions.

Ethernet utilizes the 10-bit K28.5 character to perform word alignment of a serial data stream. The first 7 most significant bits of the K28.5 are the comma character which is not present in any D codes and was designed specifically to enable word alignment.

As described above, a Fibre Channel serial data stream includes ordered sets that begin with a K28.5 character. Accordingly, if a Fibre Channel data stream were placed on an Ethernet enabled network then errors would occur because the K28.5 characters could be improperly interpreted as frame delimiters.

An example embodiment of a method of mapping a Fiber Channel serial data stream into an Ethernet packet payload will now be described.

Figure 1:
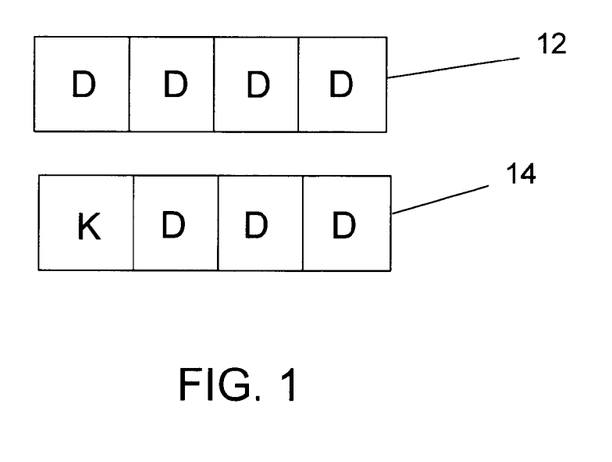
FIG. 1 illustrates examples of a Fibre Channel data word format and a Fibre Channel ordered set format.

As depicted in FIG. 1, Fibre Channel protocols are based on words composed of four bytes and include Data Words and ordered sets. A data word 12 has four byte positions with bytes of data located in each byte position. In addition to the byte data [0:7], a Z bit [8] is asserted if the byte data is to be encoded as a control character. An ordered set 14 has a control character byte located in the first byte position. This control character byte is encoded into a K28.5 control character when the byte is encoded by the 8b/10b encoder.

As described above, the control characters included in the ordered sets would cause errors to occur if the control words were inserted as part of an Ethernet packet payload. For example, the K28.5 character could be interpreted as an end-of-frame (EDF) thereby causing the word alignment function to work incorrectly.

In the present example embodiment eight Fibre Channel words (32 bytes: 256 bits) are encoded utilizing a novel 256/257 encoding scheme.

Figure 2:
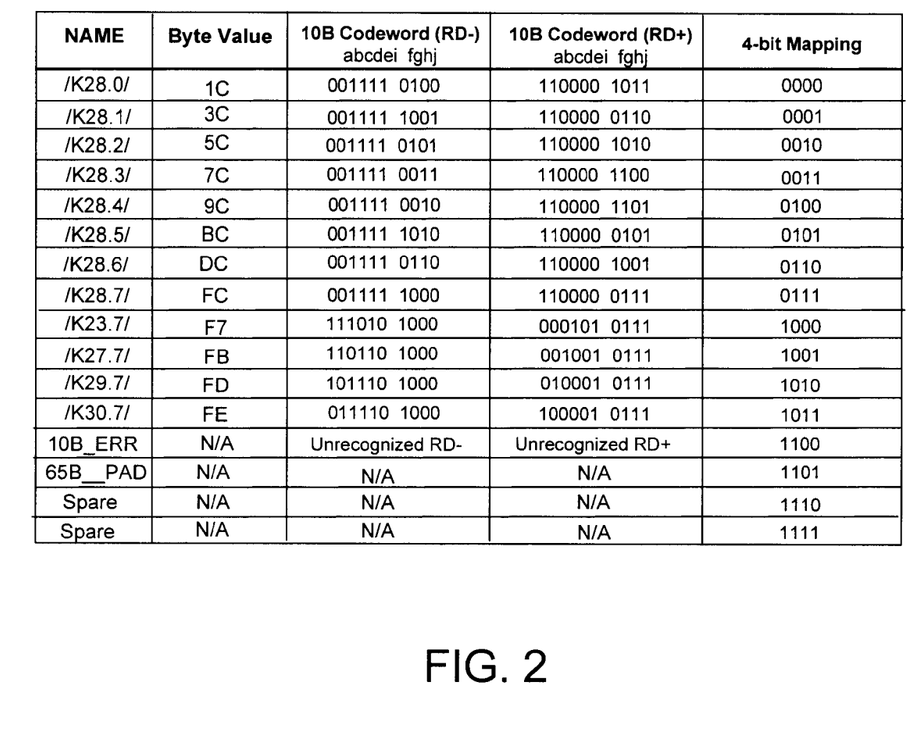
FIG. 2 illustrates an example of GFP-T 4-bit mapping of 10B control characters.

FIG. 2 depicts a mapping scheme for mapping the 8b/10b control characters into a 4-bit value. This mapping is the same as used in the above-described GFP-T technique.

Figure 3:
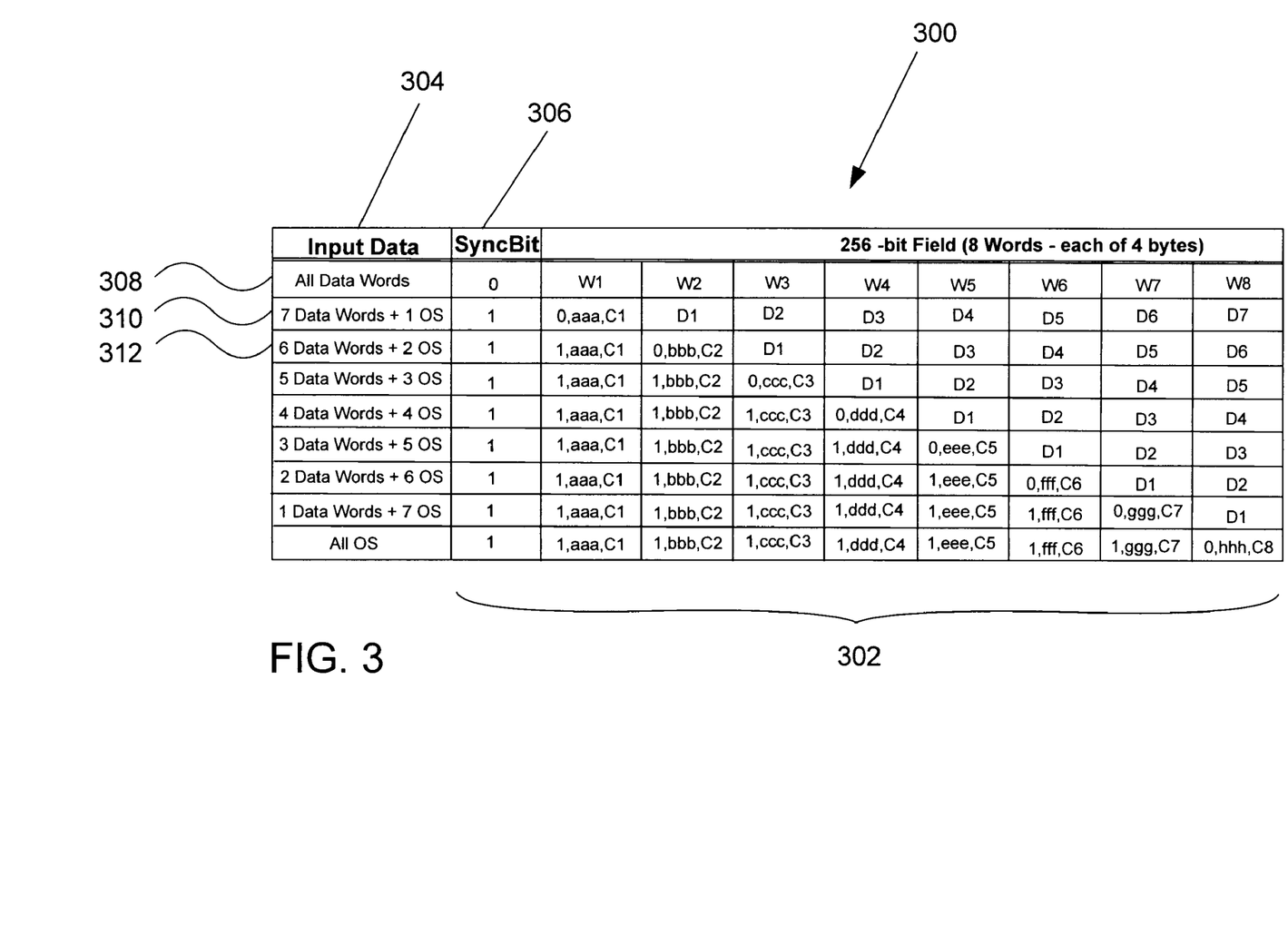
FIG. 3 illustrates an example embodiment of 256/257 encoding.

FIG. 3 illustrates a table 300 depicting the results of the 256/257 mapping technique. In FIG. 3, groups of eight words (word positions W1-W8) 302 having different numbers of ordered sets are depicted in horizontal rows. The input data received from the Fibre Channel source is described in the first column 304. The second column 306 depicts the value of the SyncBit for each 8-word group. The next eight columns depict the encoding scheme for the different 8-word groups received from the Fibre Channel source.

The first row 308 depicts the encoding for an 8-word group consisting of all data words. In this case the SyncBit is set to Logic 0 and the words are arranged in the order of receipt.

The second row 310 depicts the encoding for an 8-word group consisting of one ordered set and 7 data words. In this case, the SyncBit is set to Logic 1 to indicate that an ordered set is included in the 8-word group. The ordered set is moved to the first word position of the encoded 8-word group and the encoded control code byte at the start of the ordered set is depicted in the first word position of the row. The first bit of the encoded control code byte is a flag bit set to Logic 0 to indicate that the next word in the second word position is a data word. The 3-bit address field (aaa) indicates the location of the ordered set in the received 8-word set. For example if aaa=000 then the ordered set is the first word received and if aaa=011 then the ordered set is the third word received. The 4-bit mapping (C1) encodes the identity of the control code using the encoding scheme depicted in FIG. 2.

The third row 312 depicts the encoding for an 8-word group consisting of two ordered sets and 6 data words. In this case, the SyncBit is set to Logic 1 to indicate that an ordered set is included in the 8-word group. The ordered sets are moved to the first and second word positions of the encoded 8-word group and the encoded control code byte at the start of each ordered set is depicted in the first and second word positions of the row. In the W1 word position of the row, the flag bit of the encoded control code byte is set to Logic 1 to indicate that the next word in the second word position is an ordered set. In the W2 entry of the row, the flag bit of the encoded control code byte is set to Logic 0 to indicate that the next word in the third word position is a data word. The 3-bit address fields and the 4-bit mapping (C1) function as described above.

Figure 4:
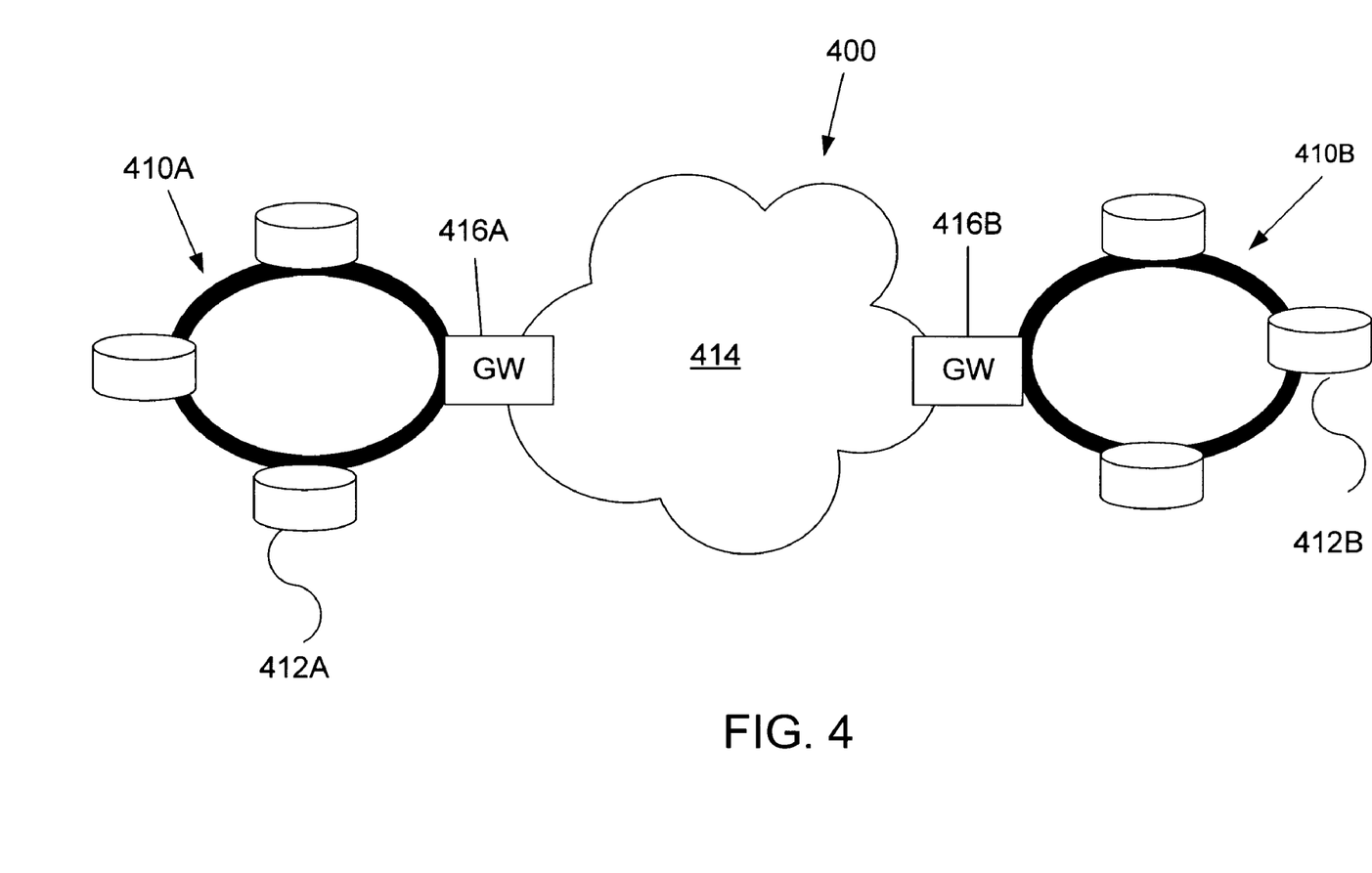
FIG. 4 illustrates an example inter-network in which example embodiments can be utilized.

FIG. 4 depicts an example inter-network configuration in which the above-described 256/257 encoding technique can be utilized. In FIG. 4 the inter-network 400 includes first and second Fibre Channel Storage Area Networks (FCSANs) 410A and B which include various storage devices 412. The first and second FCSANs 410A and B are coupled to a network fabric 414 by first and second gateway devices 416A and B. The network fabric 414 operates in accordance with either the GB or 10 GB Ethernet standards.

If a first storage device 412A in the first FCSAN 410A is to transfer data to a second storage device 412B in the second FCSAN 410B the first storage device 412A transfers the data in FC frames over the first FCSAN 410A to the first gateway 416A. The first gateway 416A then performs 256/257 bit encoding of the ordered sets and data words included in the FC frames, inserts the encoded bytes into Ethernet packets and transmits the packets over the Ethernet inter-network 414 to the second gateway 416B. The second gateway 416B removes the encoded bytes from the received Ethernet packets, performs 256/257 bit decoding to recover the ordered sets and data words, and inserts the decoded bytes into FC frames. The second gateway 416B then send the data in FC frames to the second storage device 412B over the second FCSAN 410B.

Figure 5:
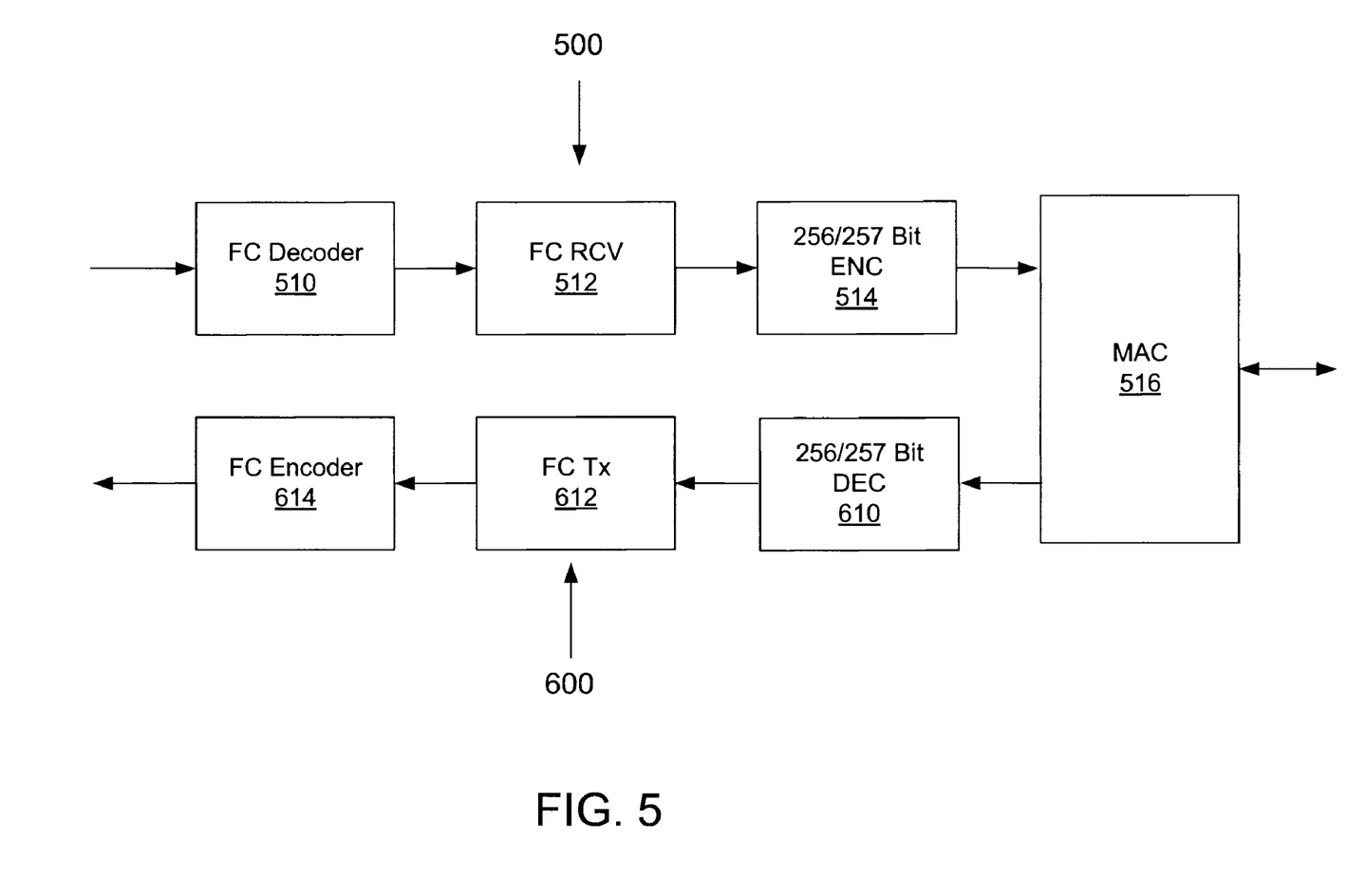
FIG. 5 illustrates an example embodiment of logic for implementing 256/257 encoding and decoding.

In this example embodiment, the 256/257 encoding logic is implemented in the gateway devices 416A and B. FIG. 5 depicts an example embodiment of logic for implementing the 256/257 bit encoding technique in the gateway devices. In FIG. 5 a transmit path 500 includes a Fibre Channel (FC) decoder 510, an FC receiver 512, and a 256/257 bit encoder 514 coupled in series. The transmit path is coupled to the input of an Ethernet Medium Access Controller (MAC) 516. The MAC 516 is coupled to the network fabric 414 via a physical layer device (not shown).

A receive path 600 is coupled to the output of the MAC 516 and includes a 256/257 bit decoder 610, an FC transmitter 612 and an FC encoder 614 coupled in series.

The operation of the 256/257 bit encoding and decoding logic depicted in FIG. 5 will now be described with reference to the flow charts of FIGS. 6 and 7. Turning first to the transmit path 500, a received serial data stream from an FC source is received at the FC decoder 510 which performs 8b/10b decoding and outputs bytes to the FC receiver 512 which composes a sequence out of the bytes it receives and sends the sequence to 256/257 bit encoder 514

Figure 6:
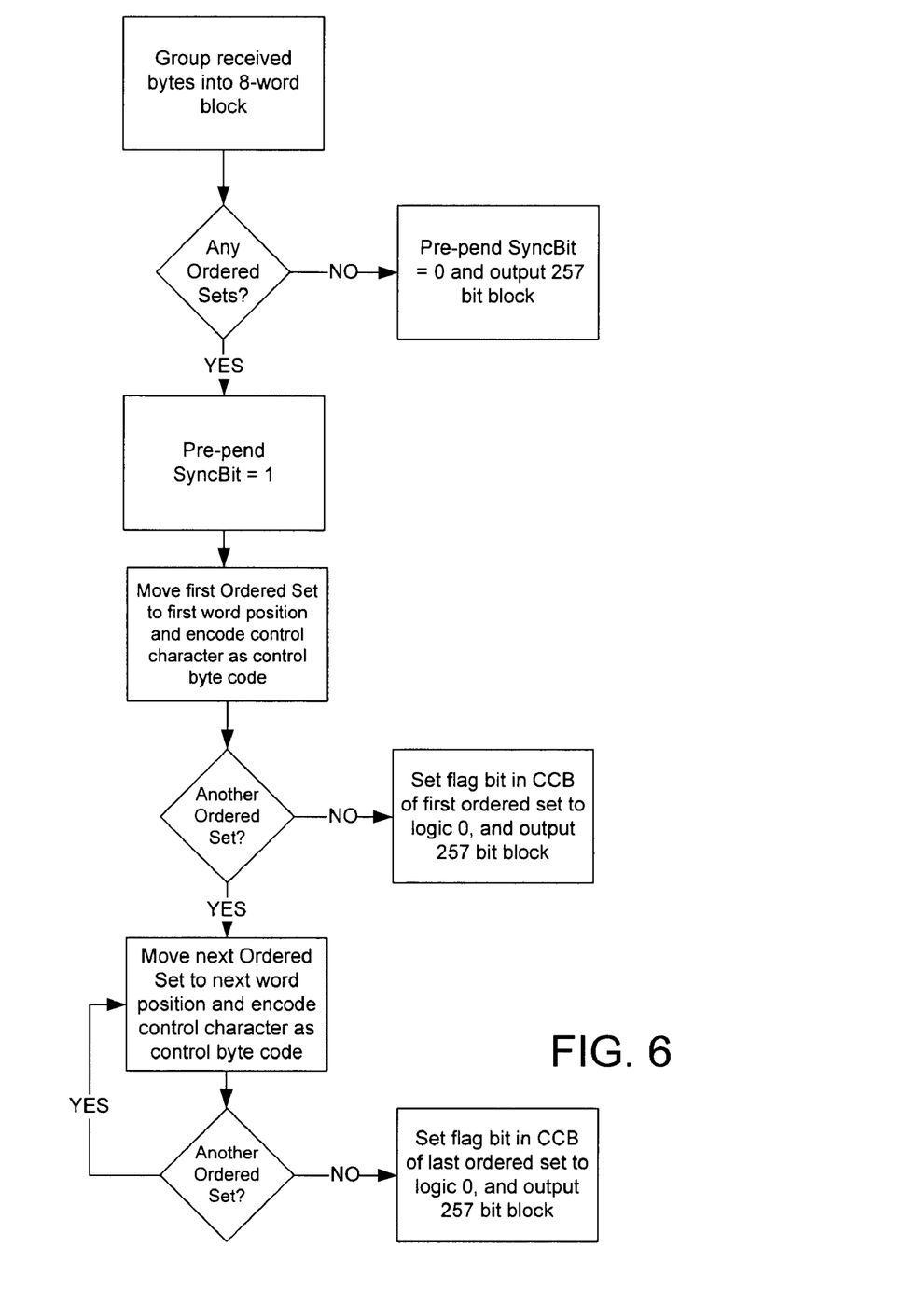
FIG. 6 is a flow chart illustrating an example embodiment of 256/257 encoding.

As depicted in FIG. 6, the 256/257 bit encoder 514 groups the received FC words into 8-word groups and control words in any included ordered sets are encoded as described above. All ordered sets are moved into the beginning word positions of the 8-word group with the address field in an encoded control code byte indicating the correct position of a moved ordered set in the received data stream. The data words are grouped in the same order as in the received data stream. The Logic value of the SyncBit is set to indicate whether any ordered sets are included in the 8-word group. The resulting 257-bit block is sent to the MAC which inserts the block into the payloads of Ethernet packets and transmits the packets over the network fabric 414.

Turning next to the receive path 600, the MAC 516 receives bytes from the network fabric 414 and composes Ethernet packets which are sent to the 256/257 bit decoder 610 which performs 256/257 decoding. As depicted in FIG. 7, data is removed from the payloads of the Ethernet packets and grouped into 257-bit blocks. The Logic value of the SyncBit indicates whether ordered sets are included in the block. If the SyncBit is Logic value=0 then all the words are data words and the data is output to the FC Transmitter 610.

If the SyncBit is Logic value=1 then ordered sets are included in the 8-word group. The mapping (C1) field of the control code byte in the first word position of the 8-word group is used to generate the correct byte to represent the control word and the address field is decoded to determine the original word position of the ordered set in the 8-word group. If the flag bit of the control code byte is Logic value=0 then the ordered set is moved to the correct position and the bytes are output to the FC Transmitter 610. If the flag bit of the control code byte is Logic value=1 the next word is processed as described above.

The FC transmitter 612 receives the decoded Ethernet frames from the 256/257 bit decoder 610, reconstructs the FC frame and sends the FC frame to the FC encoder 614 which converts every byte into 10 bits in accordance with the 8B/10B encoding scheme and then transmits the converted bytes on FCSAN 410A.

The example embodiment described is fully transparent to Fibre Channel. Both the FC data words and ordered sets are sent to a remote location. The overhead added by 256/257 encoding is 0.39% and the encoding may be used by 1, 2, 4, 8 or 10 Gb Fibre Channel over Gb or 10 Gb Ethernet.

Figure 7:
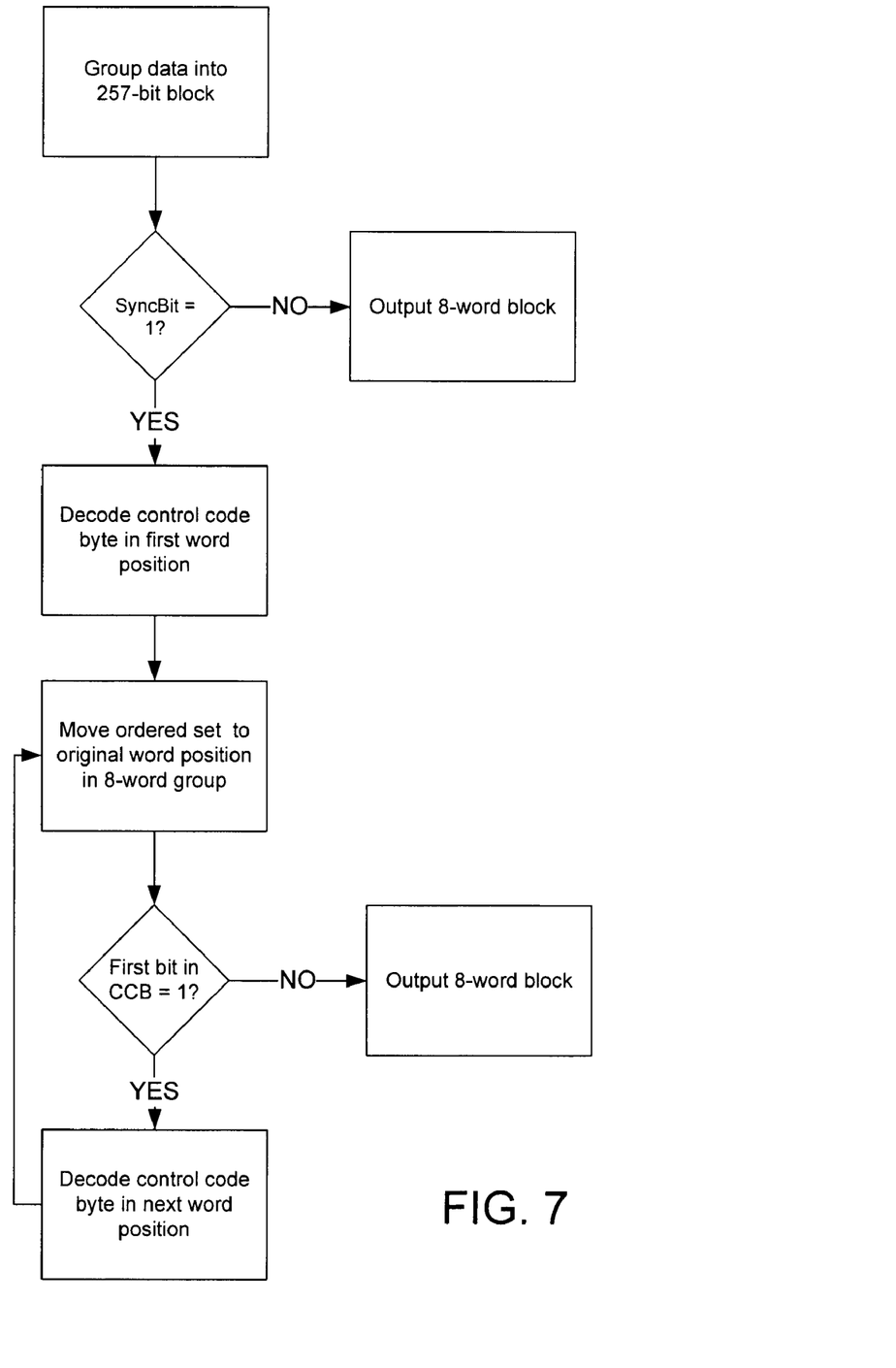
FIG. 7 is a flow chart illustrating an example embodiment of 256/257 decoding.
Figure 8:
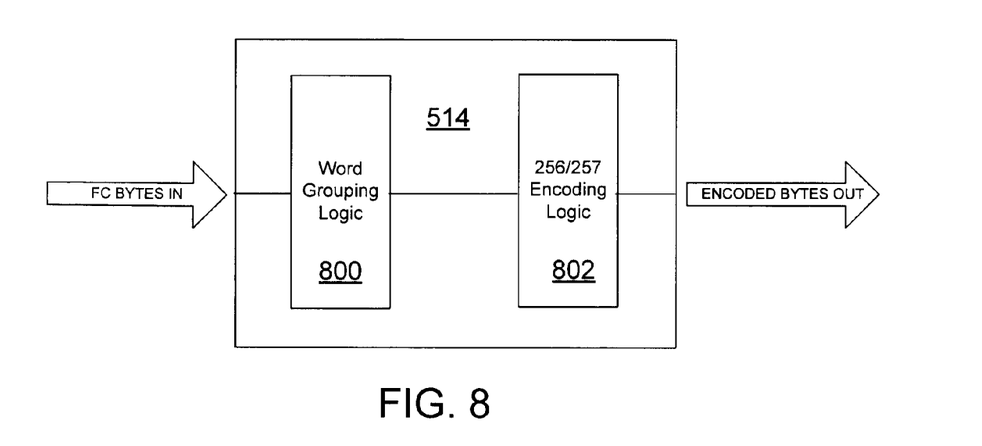
FIGS. 8 and 9 illustrate apparatuses of an example embodiment.
Figure 9:
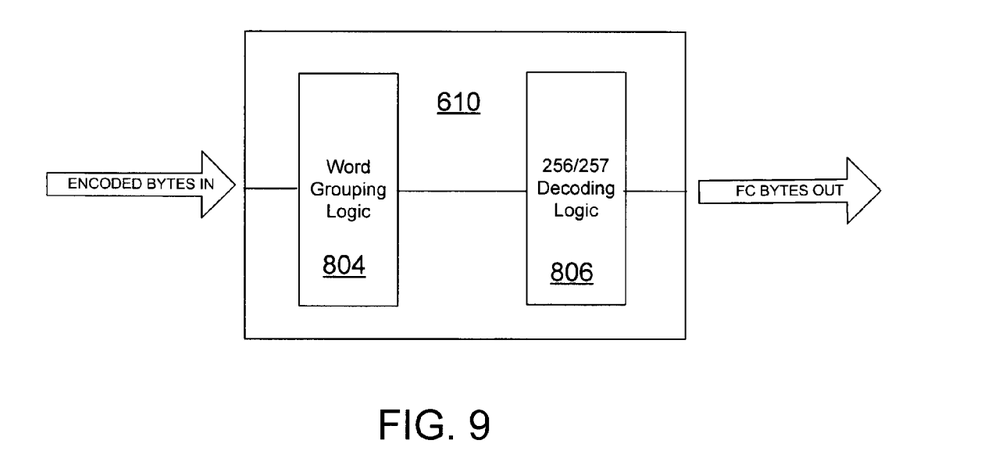

In this example embodiment the algorithms described with reference to FIGS. 6 and 7 are implemented in logic included in an application specific integrated circuit (ASIC) using a hardware description language. FIG. 8 depicts logic for implementing the 256/257 encoder 514. The word grouping logic 800 forms word groups from the received FC bytes and the 256/257 encoding logic encodes 802 the received word groups. FIG. 9 depicts logic for implementing the 256/257 decoder 610. The word grouping logic 804 forms word groups from the received encoded bytes and the 256/257 decoding logic 806 decodes the received word groups.

Figure 10:
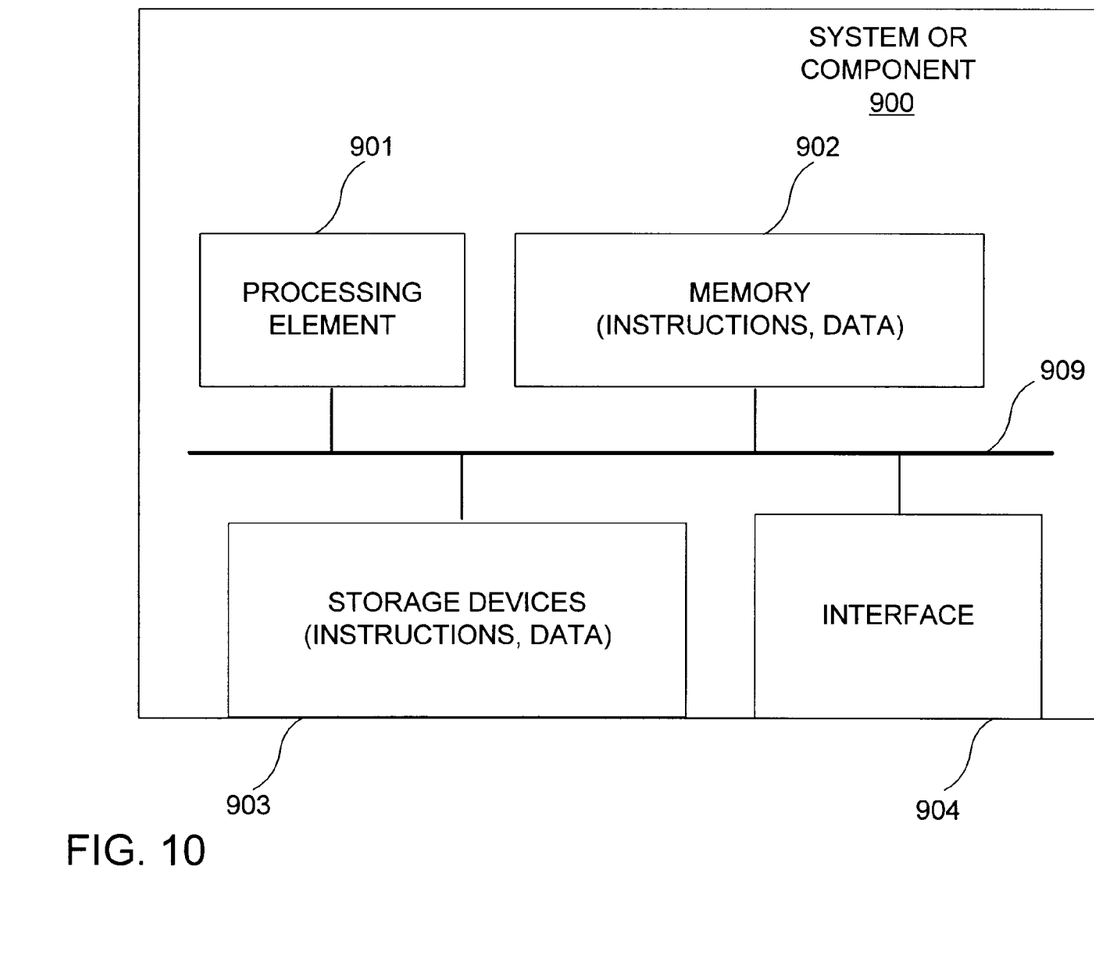
FIG. 10 illustrates an example of system component for implementing an example embodiment.

FIG. 10 shows a system block diagram of computer system 900 that may be used to execute software of an example embodiment. The computer system 900 includes memory 902 which can be utilized to store and retrieve software programs incorporating computer code that implements the algorithms described with reference to FIGS. 6 and 7, data for use with the algorithms, and the like.

Exemplary computer readable storage media include CD-ROM, floppy disk, tape, flash memory, system memory, and hard drive. Computer system 900 further includes subsystems such as a central processor 904, fixed storage 906, removable storage 908, and one or more network interfaces 910. Other computer systems suitable for use with the invention may include additional or fewer subsystems.

The system bus architecture of computer system 900 is represented by arrows 912 in FIG. 10. However, these arrows are only illustrative of one possible interconnection scheme serving to link the subsystems. For example, a local bus may be utilized to connect the central processor 904 to the system memory 902. Computer system 900 shown in FIG. 10 is only one example of a computer system suitable for use with the invention. Other computer architectures having different configurations of subsystems may also be utilized. Communication between computers within the network is made possible with the use of communication protocols, which govern how computers exchange information over a network.

The invention has now been described with reference to the example embodiments. Alternatives and substitutions will now be apparent to persons of skill in the art. For example, the technique described above can be applied to 512/513 (16 words), 1024/1025 (32 words) or 2048/2049 (64 words) encoding. In each case the address field of the control code byte must be expanded to indicate the original location of the ordered set. This is accomplished by reducing the size of the mapping field (C1) which is possible because Fibre Channel uses only the K28.5 control character.

In 512/513 encoding the address field is expanded to 4 bits and C1 is decreased to 3 bits, in 1024/1025 encoding the address field is expanded to 5 bits and C1 is decreased to 2 bits and in 2048/2049 encoding the address field is expanded to 6 bits and C1 is decreased to 1 bit. Further, the order of the flag bit, address field and control character mapping in the control code byte may be varied. Accordingly, it is not intended to limit the invention except as provided by the appended claims.

What is claimed is:

1. A method comprising:

moving a first ordered set included in a received group of Fibre Channel (FC) protocol words from its original word position to a first word position in the received group of FC protocol words to form a reordered group of FC protocol words, with each FC protocol word having four byte positions and being either a data word including four data bytes or an ordered set including a control character followed by three data bytes;

pre-pending a syncbit having a first logic value to the reordered group;

replacing the control character in the first ordered set with a control code byte indicating whether the FC protocol word in the second word position of the reordered group is an ordered set or a data word, indicating the original word position of the first ordered set in the received group of FC protocol words, and indicating the identity of the control character included in the first ordered set;

receiving a transmitted reordered group of FC protocol words;

interpreting the control code byte of a first word in the first word position of the transmitted reordered group of FC protocol words if the syncbit has the first logic value, to determine the original position of the first word in the received group of Fibre Channel (FC) protocol words and identify the control character;

replacing the control code byte with an identified control character to form the first ordered set; and moving the first ordered set to its original position in the received group of FC control words.

2. The method of claim 1 comprising:
moving a second ordered set included in a received group of Fibre Channel (FC) protocol words from its original position to a second word position in the received group of FC protocol words to form the reordered group of FC protocol words;
replacing the control character in the first second set with a control code byte indicating whether the FC protocol word in the third word position of the reordered group is an ordered set or a data word, indicating the original word position of the second ordered set in the received group of FC protocol words, and indicating the identity of the control character included in the second ordered set;
interpreting the control code byte of a second word in the second word position of the transmitted reordered group of FC protocol words if the syncbit has the first logic value and the control code byte of the first word indicates that the second word in the second word position is an ordered set, to determine the original word position of the second word in the received group of Fibre Channel (FC) protocol words and identify the control character;
replacing the control code byte of the second word with an identified control character to form the second ordered set; and
moving the second ordered set to its original position in the received group of FC control words.

3. The method of claim 2 further comprising:
moving a second ordered set to a word position following the most significant word position in the reordered group of FC protocol words;
encoding a second control character located in a first byte position of the second ordered set as a control code byte having a flag bit with a logic value indicating whether a third FC protocol word in a third word position reordered group is a data word or an ordered set, having an address field encoding the original word position of the second ordered set in the received group, and having an encoding field encoding the identity of the control character located in the first byte position of the second ordered set.

4. The method of claim 1 where the control code byte includes an address field having n, where n is a positive integer, bits sufficient to specify all word positions in the received group of FC channel words and a control character encoding field having 7-n bits.

5. A method comprising:
storing a received group of Fibre Channel (FC) protocol words from an FC source, with each FC protocol word including four byte positions and being either a data word including four data bytes or an ordered set including a control character followed by three data bytes;
if no ordered sets are included in the received group:
pre-pending a syncbit having a first logic value to the received group; and
inserting the syncbit and the received group into an Ethernet packet payload; or
if at least one ordered set is included in the group:
pre-pending a syncbit having a second logic value to the received group;
moving a first ordered set in the received group to a first word position of the received group to form a reordered group of FC protocol words;
encoding a control character located in a first byte position of the first ordered set as a control code byte having a flag bit with a logic value indicating whether a second FC protocol word in a second word position of the reordered group is a data word or an ordered set, having an address field encoding the original word position of the first ordered set in the received group, and having an encoding field encoding the identity of the control character located in the first byte position of the first ordered set;
replacing the control character of the first ordered set with the control code byte; and
inserting the syncbit and the reordered group into an Ethernet packet payload.

6. The method of claim 5 where a received group includes of eight FC protocol words, the address field includes three bits and the control code byte includes four bits.

7. The method of claim 5 where a received group includes of sixteen FC protocol words, the address field includes four bits and the control code byte includes three bits.

8. The method of claim 5 where a received group includes of thirty-two FC protocol words, the address field includes five bits and the control code byte includes two bits.

9. The method of claim 5 where a received group includes of sixty-four FC protocol words, the address field includes six bits and the control code byte includes one bit.

10. A method comprising:
extracting a group of 4-byte words and a pre-pended syncbit from an Ethernet packet payload;
if the syncbit has a first logic value:
outputting the received group to be encoded as Fibre Channel protocol words; or
if the syncbit has a second logic value:
interpreting a first 4-byte word in a first word position of the group of 4-byte words as a first ordered set;
decoding a control code byte located in a first byte position of the first ordered set, with an address field in the control byte decoded to indicate the original word position of the first ordered set in a received group, an encoding field in the control byte decoded to identify a control character, and a flag bit in the control byte decoded to indicate whether a 4-byte word in the second word position of the received group is a data word or ordered set;
replacing the control code byte with the control character encoded in the encoding field of the control code byte to form a decoded first ordered set;
moving the decoded first ordered set to the original word position indicated by the address field to form a reordered group; and
outputting the reordered group to be encoded as Fibre Channel protocol words.

11. The method of claim 10 further comprising:
if the syncbit has a second logic value and the flag bit indicates that a second 4-byte word in the second word position of the group of 4-byte words is an ordered set:
interpreting a second 4-byte word in a first word position of the group of 4-byte words as a second ordered set;
decoding a control code byte located in a first byte position of the second ordered set, with an address field in the control byte decoded to indicate the original word position of the second ordered set in a received group, an encoding field in the control byte decoded to identify a control character, and a flag bit in the control byte decoded to indicate whether a 4-byte word in the third word position of the received group is a data word or ordered set;
replacing the control code byte with the control character encoded in the encoding field of the control code byte to form a decoded second ordered set;

moving the decoded second ordered set to the original word position indicated by the address field to form a second reordered group; and outputting the second reordered group to be encoded as Fibre Channel protocol words.

12. The method of claim 10 where a received group includes of eight FC protocol words, the address field includes three bits and the control code byte includes four bits.

13. The method of claim 10 where a received group includes of sixteen FC protocol words, the address field includes four bits and the control code byte includes three bits.

14. The method of claim 10 where a received group includes of thirty-two FC protocol words, the address field includes five bits and the control code byte includes two bits.

15. The method of claim 10 where a received group includes of sixty-four FC protocol words, the address field includes six bits and the control code byte includes one bit.

16. A an apparatus comprising:
a Fibre Channel (FC) receiver configured to receive a group of FC protocol words from an FC source and output a received group of FC protocol words, with each FC protocol word having four byte positions and being either a data including of four data bytes or an ordered set including a control character followed by three data bytes, and an encoder, coupled to the decoder to receive the group of FC protocol words, with the encoder configured to pre-pend a syncbit having a first logic value to the received group and insert the syncbit and the received group into an Ethernet packet payload if no ordered sets are included in the received group or to pre-pend a syncbit having a second logic value to the received group, move a first ordered set in the received group to a first word position of the received group to form a reordered group of FC protocol words, encode a control character located in a first byte position of the first ordered set as a control code byte having a flag bit with a logic value indicating whether a following FC protocol word in a following word position of the reordered group is a data word or an ordered set, having an address field encoding the original position of the first ordered set in the received group, and having an encoding field encoding the identity of the control character located in the first byte position of the first ordered set, replace the control character of the first ordered set with the control code byte, and insert the syncbit and the reordered group into an Ethernet packet payload if at least one ordered set is included in the group.

17. An apparatus comprising:
a receiver configured to extract a group of 4-byte words and a pre-pended syncbit from an Ethernet packet payload; and an encoder, configured to be coupled to the receiver to receive the group of 4-byte words and the pre-pended syncbit from an Ethernet packet payload, with the encoder configured to output the received group to be encoded as Fibre Channel protocol data words if the syncbit has a first logic value or to decode a control code byte located in a first byte position of a first ordered set included in the first word position of the received group, with an address field in the control byte decoded to indicate the original word position of the first ordered set in the received group, an encoding field in the control byte decoded to identify a control character, and a flag bit in the control byte decoded to indicate whether a following word in the received group is a data word or ordered set, replace the control code byte with the control character encoded in the encoding field of the control code byte to form a decoded first ordered set, to move the decoded first ordered set to the original position indicated by the address field to form a reordered group, to output the reordered group to be encoded as Fibre Channel protocol words if the syncbit has a second logic value.

18. One or more non-transitory computer-readable storage media with an executable program stored thereon, wherein the program instructs a processor to perform the following steeps:

moving a first ordered set included in a received group of Fibre Channel (FC) protocol words from its original word position to a most significant word position in the received group of FC protocol words to form a reordered group of FC protocol words, with each FC protocol word having four byte positions and being either a data word including four data bytes or an ordered set including a control character followed by three data bytes;

pre-pending a syncbit having a first logic value to the reordered group;

replacing the control character in the first ordered set with a control code byte indicating whether the FC protocol word following the first ordered set in the reordered group is an ordered set or a data word, indicating the original word position of the ordered set in the received group of FC protocol words, and indicating the identity of the control character included in the first ordered set;

receiving a transmitted reordered group of FC protocol words;

interpreting the first FC protocol word as a reordered group of FC protocol words, if the syncbit has the first logic value, to determine the original position of the ordered set in the received group of Fibre Channel (FC) protocol words and to indicate the identity of the control character originally included in the first ordered set;

replacing the control code byte with an indicated control character to form an original ordered set; and moving the original ordered set to the original position of the first ordered set in the received group of FC control words.

* * * * *